May 29, 1951
E. G. SCHNEIDER
2,555,163
EXPANDED CATHODE-RAY INDICATING SYSTEM
Filed Feb. 3, 1945
2 Sheets-Sheet 1
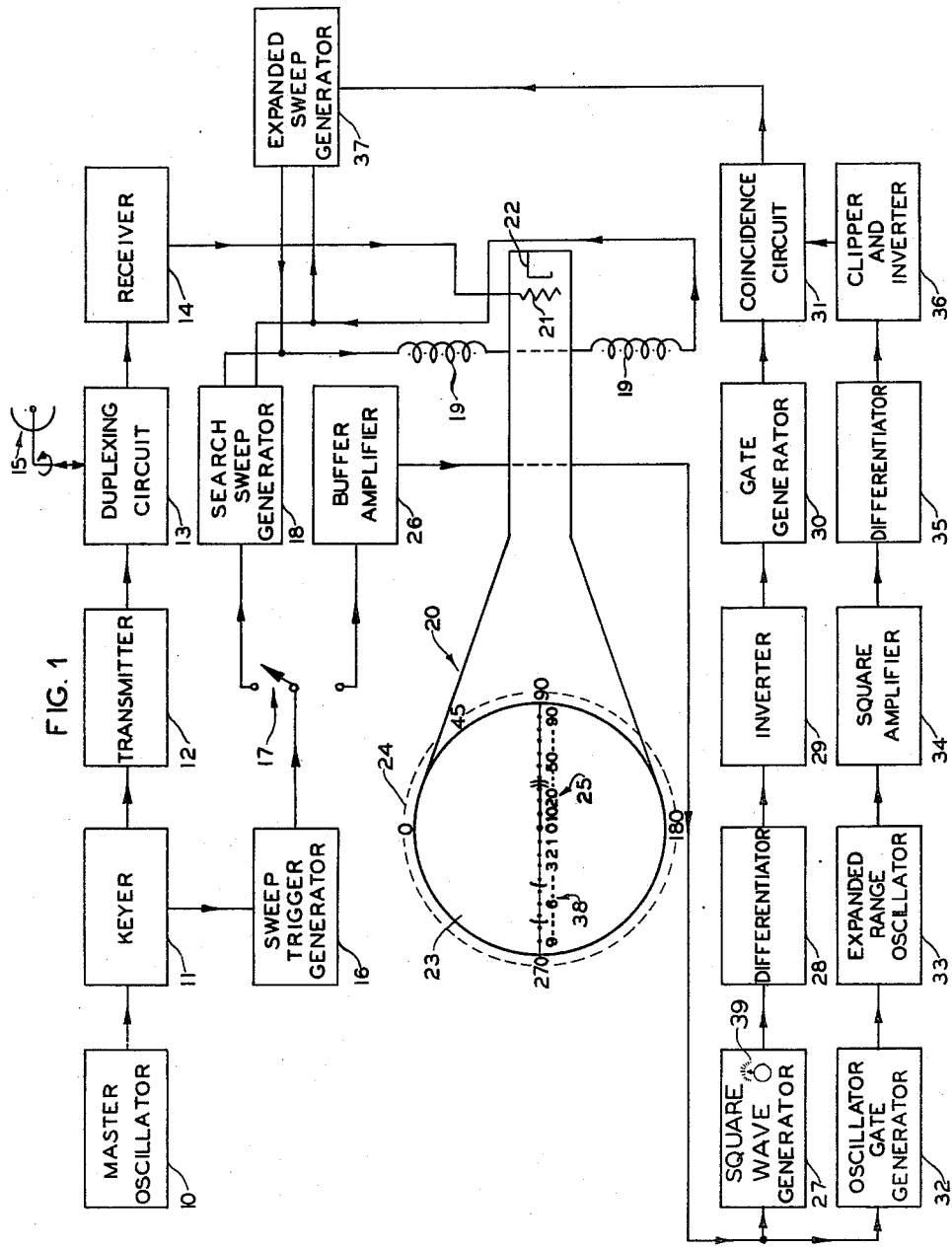
INVENTOR.
EDWIN G. SCHNEIDER
BY
William T. Hall
ATTORNEY

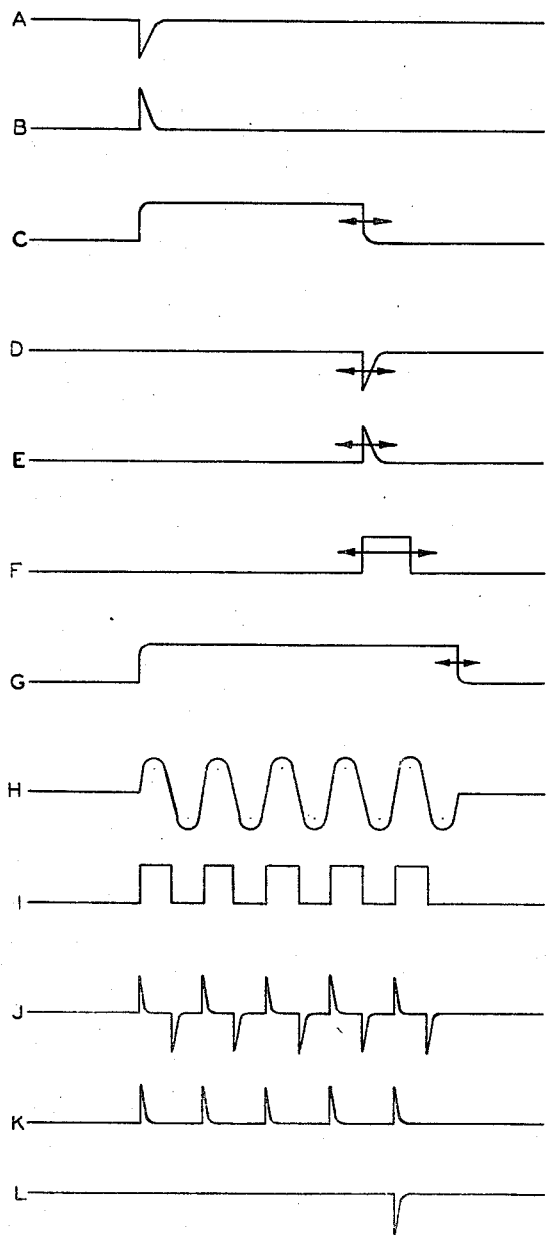

Patented May 29, 1951

2,555,163

UNITED STATES PATENT OFFICE 2,555,163

EXPANDED CATHODE-RAY INDICATING SYSTEM

Edwin G. Schneider, Watertown, Mass., assignor, by mesne assignments, to the United States of America as represented by the Secretary of War Application February 3, 1945, Serial No. 576,115

8 Claims. (Cl. 343—13)

This invention relates generally to triggering circuits, and more particularly, to a triggering circuit for initiating the sweep of the electron beam of a cathode ray indicator tube utilized in radio object locating equipment to display azimuth and range information.

Certain types of radio object locating equipment are provided with a cathode ray tube indicator having a radial sweep reaching from the center of the screen to the periphery and rotated about the tube axis. The reflected echoes control the electron beam intensity so that reflecting objects produce an indication on the screen having an angular position corresponding to the azimuth of the detected object, and having a distance from the center of the screen corresponding to the range of the object. This type of display is known as plan position indication (P. P. I.).

One of the objects of this invention is to expand the indicator sweep so that a selected portion of the range is spread over the entire indicator screen.

Other objects will be apparent from a study of the following specification, taken in connection with the accompanying drawing, in which:

Fig. 1 is a block diagram of a radio object locating apparatus utilizing a P. P. I. display and assembled in accordance with the principles of this invention; and Fig. 2 shows the approximate wave shapes of the output of the major components of said system.

Referring now more particularly to Fig. 1 of the drawing, a master oscillator 10 is provided having a sine wave output of a frequency depending upon the maximum effective range of the system. Assuming that said maximum range is 100 miles, a pulse frequency or repetition rate of 930 C. P. S. is suitable to allow a radio pulse to reach a target at the maximum effective range and permit any echo thereof to be received back by the equipment before the transmission of the next radio pulse.

The sine wave output of oscillator 10 is distorted in a keyer 11 to obtain narrow flat top pulses. The pulse output of keyer 11 is applied in part to a radio frequency oscillator or transmitter 12 whereby short pulses of radio frequency energy are obtained which, through a duplexing circuit 13 may be conveyed to a highly directional antenna system 15 adapted to be rotated, preferably continuously through 360° of azimuth. Duplexing circuit 13 is a switch for connecting transmitter 12 to antenna 15 during the transmission of pulses and for connecting receiver 14 to antenna 15 during alternate periods in order to protect receiver 14 from undue shock during transmission periods. The antenna system 15 may comprise suitable dipole radiating elements and an appropriate parabolic reflector, designed to concentrate the transmitted energy into a relatively narrow beam.

The output of the keyer 11 is also utilized to control the operation of a suitable circuit 16 adapted to generate sharp triggering pulses which, through a manually operated switching arrangement 17, may be applied to a sweep generator 18. The output of the latter, a sawtooth current, is applied to deflecting coils 19 rotatable about the neck of a cathode ray tube 20 at a rate corresponding to that of the rotation of the antenna system 15. By this arrangement the screen of the indicator tube 20 is provided with a radial electron beam trace commencing at its center and extending to its periphery.

The above described trace is rotated about its origin in synchronism with the azimuthal scanning of the antenna system 15. The radial trace and antenna system are both initially aligned with zero degrees azimuth, corresponding to transmission in a reference direction, for example, north. In the example being described the trace represents 100 miles, and therefore the generator 18 should be designed so that the time base output thereof is equal to 1075 microseconds.

When transmitted radio pulses encounter a reflecting object, echoes are received by the antenna system 15 and conveyed through the duplexing circuit 13 to the receiver 14, where they are demodulated and then applied to the control grid 21 of the indicator 20. Thus, the electron beam emanating from the cathode 22 of the tube 20 becomes intensity-modulated and there appear on the sensitized screen 23 of said tube, short arcs whose positions depend, as hereinbefore stated, upon the respective azimuths and ranges of the reflecting objects. The indicator screen may be calibrated about its periphery, as at 24, in terms of azimuth, and along a reference diameter, as at 25, in terms of range.

In Fig. 1 of the drawings, two target indications are shown on the right-hand side of the screen 23, their particular position being merely illustrative. It will be noted that both indications are between the 30 and 40 mile markers on the range scale 25. The range of neither target can be discerned with any great particularity.

The features of the invention which enables these detected objects to be more closely examined to permit their ranges to be determined with increased accuracy will now be described. For this purpose, reference will be made to the wave shapes shown in Fig. 2 of the drawing as well as to the block diagram of Fig. 1.

At A in Fig. 2, there is diagrammatically represented the pulse output of the sweep trigger generator 16. As above stated, this output is fed to the switch 17, in one of the positions of which, here shown as the upper, said output is applied to the search sweep generator 18. In the other position of said switch, the trigger pulse output of the generator 16 is applied to a conventional buffer amplifier 26, where it is inverted, as shown in Fig. 2B.

The positive-going pulses thus obtained which, it will be recalled, are synchronized with the radio pulse transmission, are applied in part to any preferred, highly accurate rectangular wave generator 27 for producing positive-going rectangular waves of selectively variable width, as shown in Fig. 2C. Such rectangular wave generators are well known in the art, an example thereof being shown on page 176 and Figs. 4–9 in "Ultra High Frequency Techniques" by Brainerd, Koehler, Reich, and Woodruff, published by D. Van Nostrand Co., Inc. in 1942. Generator 27 may be provided with a selector switch 39 for adjusting the length of the rectangular wave produced.

The adjustable lagging edge of the rectangular wave produced by generator 27 is then differentiated in a circuit 28 having a short time constant, to obtain the sharp triggering pulses shown at D in Fig. 2, said pulses then being inverted by a conventional inverter amplifier 29 to obtain the positive-going pulses shown at E in Fig. 2. These pulses are utilized to trigger a gate generator 30 producing a positive-going rectangular output wave. Generator 30 may be similar to generator 27, except that it produces rectangular waves of fixed width. In the case under consideration, the waves may have a width of approximately 107.5 microseconds, which is the time required for the radio pulses to travel out and be reflected back over 10 miles, the distance to be represented by the expanded sweep referred to in the earlier portions of this specification.

The resulting rectangular enabling wave or gate, diagrammatically shown in Fig. 2F, is adjustable in phase or time relation with respect to For this purpose, the output of the buffer amplifier 26 in addition to being applied to the rectangular wave generator 27, is also applied to an oscillator gate generator 32, which is similar to generator 27 and has a positive-going rectangular output wave of adjustable width as shown at G in Fig. 2. This output is applied to a conventional normally inoperative stable oscillator 33, which, for the duration of said rectangular output wave, generates a sine wave, shown in Fig. 2H, the frequency of which is a submultiple of the frequency or pulse repetition rate of the transmitted radiant energy. In the embodiment described, the frequency of oscillator 33 is 9300 C. P. S., corresponding to a period of 107.5 microseconds.

The positive alternations of said sine waves are distorted by a squarer-amplifier 34 to obtain the square-wave train shown in Fig. 2I. Squaring circuits are well known in the art and may consist of a top-clipper tube followed by an amplification stage.

The wave shown in Fig. 2I is differentiated in a circuit 35, Fig. 1, as shown in Fig. 2J, and is then clipped and inverted in an appropriate circuit 36, to obtain the trigger pulses shown diagrammatically in 2K. These pulses are separated by the exact time required for the radio pulses to travel out and be reflected back over 10 miles, the distance to be represented by the expanded sweep trace.

The pulse output of the clipper-inverter 36 is applied to the second control element of the coincidence circuit 31, and whichever pulse occurs during the period when said coincidence circuit is conditioned for operation as above described by the gate shown in Fig. 2F, causes said circuit to pass said pulse, as shown in Fig. 2L. The latter pulse triggers an expanded sweep generator 37, Fig. 1, adapted to produce a sawtooth current whose period is, in the case being considered, 107.5 microseconds, representing a range of 10 miles. The output of the expanded sweep generator has a wave form similar to that of the search sweep generator applied to the deflecting coils 19 of the cathode-ray indicator tube 20.

The range scale on screen 23 of indicator tube 20 relating to the expanded sweep, which is shown on the left-hand side of the screen 23, may be calibrated in terms of range, as shown at 38.

Assuming that the delay introduced by the searching may be determined with greater accuracy than has heretofore been possible.

Other advantages of my present invention will readily occur to those skilled in the art to which the same relates.

I claim:

1. In combination with a pair of sweep circuits the time base of one of which is a fraction of that of the other, and a source of energy for selectively triggering one or the other of said circuits including a connection thereto: means initiating the operation of the one of said circuits having the shorter time base responsive to said source of triggering energy, for delaying the start of the operating period of said last-named circuit by any selected amount of time which is less than that of the operating period of the circuit having the longer time base; said means including a normally inoperative coincidence circuit having dual control elements and a connection to said shorter time base sweep circuit; a circuit for generating gating voltage pulses and applying the same to one of the dual control elements of said coincidence circuit to condition the latter for operation, a connection being provided therebetween; a circuit for controlling the time of the generation of said gating pulses with respect to the operation of said source of triggering energy; circuit means connecting said controlling and said gating voltage generating circuits; and a circuit for generating trigger pulses under the control of said triggering energy, and applying the same to the second of the control elements of said coincidence circuit, whereby the arrival of any of said trigger pulses at said coincidence circuit during the application thereto of said gating pulses causes said coincidence circuit to operate and initiate the functioning of said shorter time base sweep circuit.

2. In combination with a pair of sweep circuits the time base of one of which is a fraction of that of the other, and a source of energy for selectively triggering one or the other of said circuits including a connection thereto: means, initiating the operation of the one of said circuits having the shorter time base responsive to said source of triggering energy, for delaying the start of the operating period of said last-named circuit by any selected amount of time which is less than that of the operating period of the circuit having the longer time base; said means including a normally inoperative circuit including a connection to said shorter time base sweep circuit, having dual control elements, for initiating the functioning of said shorter time base sweep circuit; a circuit for generating gating voltage pulses and applying the same to one of said dual control elements to condition said generating circuit for operation, a connection being provided therefor; a circuit for controlling the time of the generation of said gating pulse with respect to said source of triggering energy; circuit means connecting said controlling and said gating voltage generating circuits; and a circuit for generating trigger pulses under the control of said triggering energy and a connection for applying said trigger pulses to the second of said control elements; coincidence between said gating pulse and any of said trigger pulses rendering said normally inoperative circuit operative to initiate the functioning of said shorter time base sweep circuit.

3. In a radio object-locating system, the combination comprising means for transmitting successive exploratory pulses; means for receiving reflected echo pulses; a cathode-ray tube oscilloscope; a first sweep circuit for said oscilloscope, said first sweep circuit having a time base equal to the period between said exploratory pulses; a second sweep circuit for said oscilloscope, said second sweep circuit having a time base which is a fraction of that of said first sweep circuit; a source of energy for selectively triggering, in synchronism with said exploratory pulses, said first or second sweep circuit; means intermediate said source of triggering energy and said second sweep circuit for delaying the start of the operating period of said second sweep circuit by any selected amount which is less than that of the operating period of said first sweep circuit; said means including a normally non-operating circuit means, having dual control elements, for initiating the functioning of said second sweep circuit, the operation of said circuit means depending on the simultaneous activation of said dual elements; a circuit for generating a gate and applying the same to one of said dual control elements; a circuit for controlling the time of the generation of said gate with respect to said source of triggering energy; a circuit for generating trigger pulses under the control of said triggering energy and applying the same to the second of said control elements, coincidence between said gate and any of said trigger pulses rendering said normally non-operating circuit means operative to initiate the functioning of said second sweep circuit; and means for applying said echo pulses to said oscilloscope whereby there is selectively indicated on the screen of said oscilloscope the full range of the system or a selected portion of said range.

4. In a radio object-locating system, the combination comprising means for transmitting successive exploratory pulses; means for receiving reflected echo pulses; a cathode-ray tube oscilloscope; a first sweep circuit for said oscilloscope, said first sweep circuit having a time base equal to the period between said exploratory pulses; a second sweep circuit for said oscilloscope, said second sweep circuit having a time base which is a fraction of that of said first sweep circuit; a source of energy for selectively triggering, in synchronism with said exploratory pulses, said first or second sweep circuit; means intermediate said source of triggering energy and said second sweep circuit for delaying the start of the operating period of said second sweep circuit by any selected amount which is less than that of the operating period of said first sweep circuit; said means including a normally non-operating circuit means, having dual control elements, for initiating the functioning of said second sweep circuit, the operation of said circuit means depending on the simultaneous activation of said dual elements; a circuit for generating a gate and applying the same to one of said dual control elements; a circuit for controlling the time of the generation of said gate with respect to said source of triggering energy; a circuit for generating trigger pulses under the control of said triggering energy and applying the same to the second of said control elements, the repetition rate of said trigger pulses being an integral multiple of that of said source of triggering energy, the width of said gate being equal to the period between said trigger pulses, coincidence between said gate and any of said trigger pulses rendering said normally non-operating circuit means operative to initiate the functioning of said second sweep circuit; and means for applying said echo pulses to said oscilloscope whereby there is selectively indicated on the screen of said oscilloscope the full range of the system or a selected portion of said range.

5. In a radio object-locating system, the combination comprising means for transmitting successive exploratory pulses; means for receiving reflected echo pulses; a cathode-ray tube oscilloscope; a first sweep circuit for said oscilloscope, said first sweep circuit having a time base equal to the period between said exploratory pulses; a second sweep circuit for said oscilloscope, said second sweep circuit having a time base which is a fraction of that of said first sweep circuit; a source of energy for selectively triggering, in synchronism with said exploratory pulses, said first or second sweep circuit; means operatively interposed between said source of triggering energy and said second sweep circuit for delaying the start of the operating period of said second sweep circuit by any selected amount which is less than that of the operating period of said first sweep circuit; said means including a normally non-operating coincidence circuit means having dual control elements, the operation of said circuit means depending on the simultaneous activation of said dual elements; a circuit for generating a gate and applying the same to one of the dual control elements of said coincidence circuit to condition the latter for subsequent operation; a circuit for controlling the time of generation of said gate with respect to the operation of said source of triggering energy; a circuit for generating trigger pulses under the control of said triggering energy and applying the same to the second of the control elements of said coincidence circuit, whereby the arrival of any of said trigger pulses at said coincidence circuit during the application thereto of said gate causes said coincidence circuit to operate and initiate the functioning of said second sweep circuit; and means for applying said echo pulses to said oscilloscope whereby there is selectively indicated on the screen of said oscilloscope the full range of the system or a selected portion of said range.

6. A radio object-locating system, as defined in claim 5, wherein said circuit for controlling the generation of said gate with respect to the source of triggering energy includes a generator in synchronism with said source of triggering energy for producing rectangular waves of selectively variable width; and means for synchronizing the generation of said gate with the lagging edge of said rectangular waves, whereby the time position of said gate with respect to said source of triggering energy is controllable by said generator.

7. In combination with a pair of sweep circuits, the time base of the first sweep circuit being a multiple of that of the second sweep circuit, means to supply first triggering pulses to initiate operation of the first sweep circuit at a predetermined frequency corresponding to the time base of the first sweep circuit, means for delaying the start of the operating period of said second sweep circuit including a normally non-operating coincidence circuit having an output to initiate operation of said second sweep circuit and dual control elements, means to supply second triggering pulses at said multiple of said predetermined frequency to one of said control elements, a circuit for generating a gating pulse of substantial duration not greater than the interval between said second triggering pulses connected to the other of said control elements, a circuit for controlling the time of generation of said gating pulses with respect to said first triggering pulses including a connection for applying pulses from said first trigger pulse means for controlling said controlling circuit, whereby the arrival of any one of said second triggering pulses at said coincidence circuit during the application thereto of said gating pulse causes said coincidence circuit to operate and initiate the functioning of said second sweep circuit.

8. In combination with cathode ray tube means having means to vary the amplitude of the cathode ray beam in response to received signals and a pair of sweep circuits, the time base of the first sweep circuit being a multiple of that of the second sweep circuit, means to supply first triggering pulses for the first sweep circuit at a predetermined frequency corresponding to the time base of the first sweep circuit, means for delaying the start of the operating period of said second sweep circuit including a normally non-operating circuit having an output to control said second sweep circuit and dual control elements, means responsive to said first triggering pulses to supply second triggering pulses at said multiple of said predetermined frequency to one of said control elements, a circuit for generating gating pulses of substantial duration not greater than the interval between said second triggering pulses connected to the other of said control elements, and a circuit for controlling the time of generation of said gating pulses with respect to said first triggering pulses including a connection for applying pulses from said first triggering pulse means for controlling said controlling circuit, whereby the arrival of any one of said second triggering pulses at said normally inoperative circuit during the application thereto of said gating pulse causes said normally inoperative circuit to operate and initiate the functioning of said second sweep circuit.

EDWIN G. SCHNEIDER.

REFERENCES CITED

The following references are of record in the file of this patent:

UNITED STATES PATENTS

| Number | Name | Date |
| --- | --- | --- |
| 2,312,761 | Hershberger | Mar. 2, 1943 |
| 2,355,363 | Christaldi | Aug. 8, 1944 |
| 2,373,145 | Sensiper et al. | Apr. 10, 1945 |
| 2,368,449 | Cook | June 30, 1945 |
| 2,403,600 | Holmes | July 9, 1946 |
| 2,421,018 | De Rosa | May 27, 1947 |
| 2,422,204 | Meacham | June 17, 1947 |
| 2,422,698 | Miller | June 24, 1947 |
| 2,454,782 | De Rosa | Nov. 30, 1948 |

FOREIGN PATENTS

| Number | Country | Date |
| --- | --- | --- |
| 520,778 | Great Britain | May 3, 1940 |
| 552,072 | Great Britain | Mar. 22, 1943 |
| 113,233 | Australia | June 12, 1941 |